INVENTORS
JOHN TURTORA &
JEAN CHARITAT, Jr.

BY Hurwitz & Rose

ATTORNEYS

United States Patent Office 3,447,376
Patented June 3, 1969

3,447,376
HIGH ACCURACY TEMPERATURE MEASURING DEVICES
John Turtora, Fairfax, and Jean Charitat, Jr., Falls Church, Va., assignors to Radiation Systems Incorporated, Alexandria, Va., a corporation of Nevada
Filed Apr. 12, 1966, Ser. No. 542,025
Int. Cl. G01k 5/18
U.S. Cl. 73—359                    8 Claims

ABSTRACT OF THE DISCLOSURE

A thermoelectric thermometer having a sensing probe and a reference probe connected in series opposition to produce a signal indicative of the temperature difference between the probes. The reference probe is in thermal contact with a thermally sensitive temperature indicator and a temperature-varying device. The temperature difference signal causes the temperature-varying device to change the temperature of the reference probe and indicating device, so as to null the temperature difference signal at which null the temperature indication of the indicating device is the temperature to which the sensing probe is exposed.

---

The present invention relates generally to temperature measuring devices, and more particularly to thermometric instrumentation employing a closed loop feedback system to provide measurement accuracy commensurate with the precision of a thermometric standard.

Recent medical research has indicated a need for instruments capable of providing highly accurate measurements of temperature at various locations, such as the tympanic membrane, in the body of a human patient or other animal subject. It has been found that known temperature measuring devices are incapable of fulfilling the exacting, and sometimes conflicting, requirements of such instrumentation, hence presenting a deterrent to the full development of this research in the medical field and related fields of endeavor. For example, in addition to a requirement of measuring temperature of membranes to an accuracy of better than 0.02 degree centigrade, a suitable device must be small, easily transportable, rugged, self-contained, reliable, and relatively inexpensive.

It is a primary object of the present invention to provide an improved temperature measuring instrument which meets and exceeds the aforementioned requirements.

Briefly, according to one embodiment of the present invention, an electronic comparison is effected between the temperatures of a thermal sensing probe and a secondary thermal standard, and any difference therebetween employed to control, via a closed loop feedback system, the temperature of the secondary standard so that the latter is driven to exactly equal the temperature of the probe. The temperature sought to be measured may then be accurately and conveniently ascertained from the secondary standard.

Accordingly, it is a further object of the present invention to provide an improved temperature measuring device utilizing a temperature standard and a closed loop feedback system to provide high accuracy.

In the aforementioned embodiment, a thermoelectric transducer is employed as the probe to accurately sense the temperature to be measured and to produce an output signal representative of that temperature. The secondary standard preferably comprises a mercury thermometer having associated therewith an element for controlling the temperature of the body or pool of mercury within the thermometer bulb and a further thermoelectric transducer for sensing the temperature of the mercury and for producing an output signal proportional to the latter temperature. The outputs of the two transducers are coupled in polarity opposing relationship to a null sensing closed loop feedback system which provides a control or driving output to the temperature controlling element of the mercury thermometer. In this manner, any temperature difference between the probe and the thermometer is effective to produce an error signal resulting in an appropriate compensation of the mercury temperature to reduce the difference to zero. The thermometer reading is thereby maintained equal to and indicative of the probe temperature.

An advantage of temperature measuring systems in accordance with the present invention resides in the achievement of accuracy of a calibrated mercury thermometer.

Another advantage of such systems is that the temperature under measurement may be read by an observer directly from a mercury column thermometer, a familiar and proven instrument. A related advantage is that no special training of the observer is required as in the case of complex, high accuracy, prior art temperature measuring systems.

Still another advantage of the present invention is that the sensor probe may be small and delicate without limiting the use or degrading the performance of the system.

Further advantages of the invention include ease of ruggedizing the system so that system accuracy is relatively independent of rough handling and infrequent maintenance; remote readability relative to location of the temperature sensor probe; and capability of temperature reading resolution exceeding the accuracy of the system.

The above and still further objects, features and attendant advantages of the present invention will become apparent from a consideration of the following detailed description of certain exemplary embodiments thereof, especially when taken in conjunction with the accompanying drawings, wherein.

Figure 1:
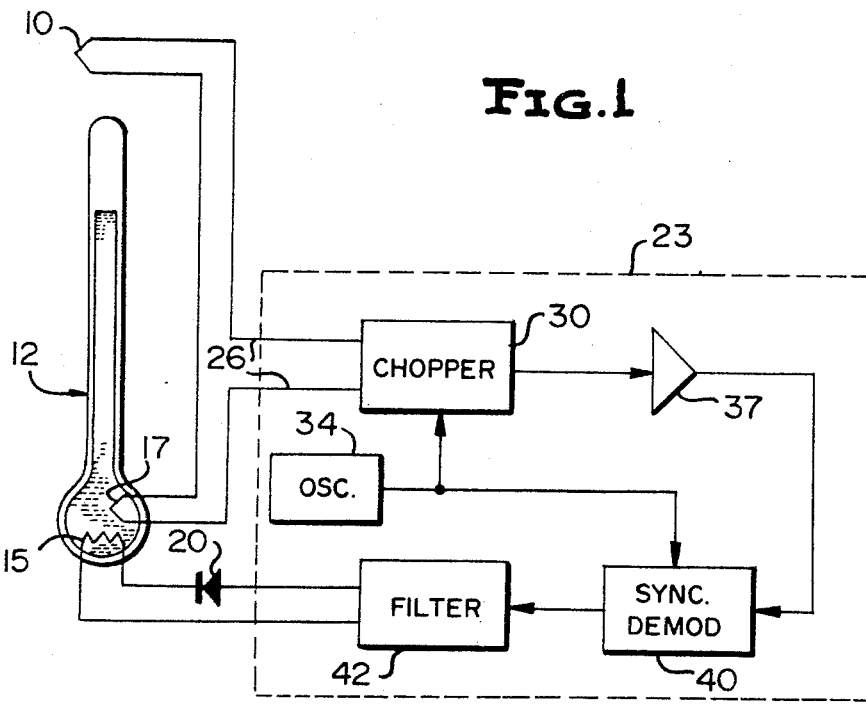
FIGURE 1 is a circuit diagram of the overall temperature-measuring system of the invention.

Referring now to FIGURE 1, one embodiment of a temperature measuring system in accordance with the present invention comprises a temperature sensor probe 10, such as a thermocouple sensor of the type disclosed by Dr. Theodore H. Benzinger in U.S. Patents 3,054,397 and 3,156,117; a secondary standard 12, here illustrated as a mercury bulb thermometer; a heating element 15 for the temperature sensitive fluid contained in the thermometer; a thermoelectric transducer or sensor 17, such as a thermocouple, arranged within the thermometer bulb to detect the temperature of the fluid (mercury) therein and to produce an output voltage representative thereof; a diode 20 to permit current flow in only one direction through heating element 15; and an error amplifying feedback unit 23.

The sensor probe thermocouple 10 and the fluid temperature sensing thermocouple 17 are connected in series opposition so that the voltage applied to unit 23 on leads 26 is the difference between the output voltages of the two thermocouples and represents the difference in the temperatures to which they are subjected. This difference voltage or error signal is applied to a chopper 30 which produces an A-C signal at its output terminals, the latter signal having a frequency governed by the output frequency of an oscillator 34, which determines the chopping rate of the error signal. Conversion of the D-C error signal to an A-C signal permits the use of an A-C amplifier 37, thereby obviating problems of drift normally associated with attempts to amplify low-level D-C signals. The amplified A-C signal is demodulated by a synchronous detector 40, to which is also applied the signal generated by oscillator 34, and the detector output signal is filtered by narrow bandwidth filter 42 to remove any noise present thereon. The resultant D-C output is applied in opposite polarity, relative to the input error signal, to heater 15.

A difference in the temperatures detected by thermocouples 10 and 17 will therefore result in current flow through heater 15 until the temperature of the mercury in the thermometer bulb, as sensed by thermocouple 17, is equal to that detected by probe sensor thermocouple 10, at which time the error voltage is nulled. The ambient temperature of the thermometer is normally less than that of the probe when a measurement is initiated, hence current flow is in one direction only through heater 15. In order to avoid operation of the heater in the unstable region, in the unlikely event that bulb temperature exceeds sensor probe temperature, diode 20 is connected in series circuit with the heater to prevent current flow therethrough.

By means of the system of FIGURE 1, the probe temperature is indicated with high accuracy on the scale of mercury column thermometer 12 and requires no subsequent interpolation or special skill to obtain a reading.

The system of FIGURE 1 may be modified to permit appropriate control of thermometer fluid temperature irrespective of the polarity of the error signal, i.e., both in cases where thermometer temperature exceeds probe temperature and vice versa, by replacing heater 15 and diode 20 with a thermoelectric heating and cooling element. Suitable semiconducting devices displaying Seebeck and Peltier effect, operative to generate heat for current flow in one direction and to absorb heat (i.e., to cool) for current flow in the opposite direction, are well known in the art. The polarity of the D-C output signal from error amplifying feedback circuit 23 applied to the thermoelectric heating and cooling element is then effective to cause the appropriate generation or absorption of heat.

If, for example, the polarity of the error signal obtained by combining the D-C signals from the two transducers is positive relative to a reference potential existing at a preselected one of the input leads to the error amplifier 23, and this positive polarity is indicative of a lower thermometer reading than the temperature sensed by probe, the connections between the output of the error amplifier and the electrodes of the heating-cooling element are arranged so that the thermometer fluid is heated. A subsequent reversal of this polarity will then automatically cause an absorption of heat from the thermometer fluid by reversing the direction of current flow through the heating-cooling element, thereby producing the proper direction of temperature change for a negative polarity error signal.

Figure 2:
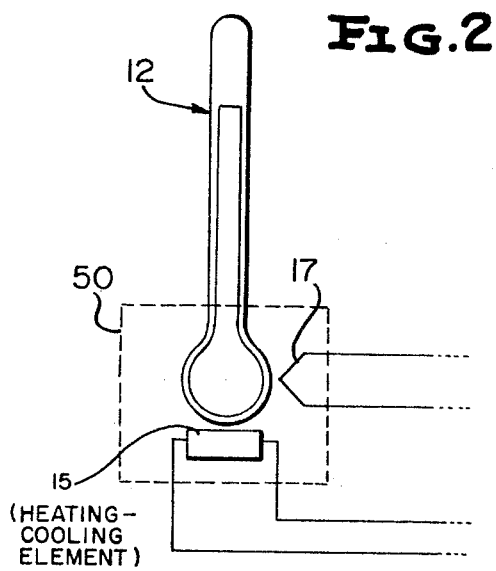
FIGURE 2 is a modification of the temperature standard sensing and heating arrangement of FIGURE 1.

A further modification of the system of FIGURE 1 is shown in FIGURE 2. Referring to the latter figure, heater 15 and thermocouple 17 are disposed externally of the bulb of thermometer 12, but are thermally coupled thereto by immersing the bulb and the aforementioned elements in a thermally conductive medium 50, such as a dielectric fluid (e.g., oil) or by imbedding these components in an electrically insulated mass of aluminum. This modification, however, is subject to the disadvantage of slower response time as compared to the rapid response to temperature changes of the system of FIGURE 1.

Figure 3:
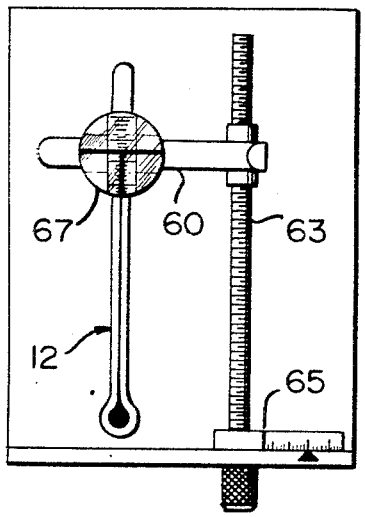
FIGURE 3 is an elevational view of a vernier mechanism for use in reading the temperature standard.

Better resolution in temperature readings and reduction of parallax may be achieved by several distinct methods. For example, as shown in FIGURE 3, an indicator crosshair 60, adjustable over the scale of indicia of the thermometer via a lead screw 63 coupled to a conventional vernier mechanism 65, may be employed, with an attendant increase in accuracy. Provision of a magnifying lens 67 over the indicator further improves readability and accuracy.

The system may also be operated as a recording thermometer by optically focusing the temperature scale of the thermometer on a continuously moving film or light sensitized recording paper, so as to obtain a time history of the sensor temperature.

While we have disclosed certain preferred embodiments of our invention it will be apparent that variations in the specific details of construction which have been illustrated and described may be resorted to without departing from the spirit and scope of the invention.

We claim:
1. Apparatus for indicating the temperature to which a thermoelectric probe is subjected, said apparatus comprising
   heat-conductive thermally sensitive means for rapidly assuming the temperature of a body in direct heat-transferring relationship therewith and which indicates its own temperature;
   means directly contacting said thermally sensitive means for generating an electrical signal having an amplitude related to the temperature of said thermally sensitive means;
   said probe including means for generating an electrical signal whose amplitude bears the same relation to the temperature to which said probe is subjected as the relation of the signal amplitude of the first-named electrical signal generating means to the temperature of said thermally sensitive means;
   means for combining the electrical signal generated by said first-named signal generating means with the electrical signal generated by the signal generating means of said probe to produce a further signal indicative of the difference in amplitude therebetween; and
   a closed loop feedback circuit including
      an amplifier responsive to said further signal for increasing the amplitude thereof;
      temperature-varying means in direct heat-transferring relationship with said thermally sensitive means and responsive to said further signal of increased amplitude for varying the temperature of said thermally sensitive means in a direction to null said difference in amplitude; and
      means for applying said further signal of increased amplitude to said temperature-varying means;
   whereby the temperature indicated by said thermally sensitive means as its own temperature corresponds to the temperature to which said thermoelectric probe is subjected when said difference in amplitude is nulled.

2. The combination according to claim 1 wherein said temperature-varying means is effective to generate heat or to absorb heat depending upon the polarity of the amplified signal applied thereto.

3. The combination according to claim 1 wherein said temperature-varying means comprises an electric heating element and a diode connected in series circuit therewith to limit the flow of current through said heating element to a preselected direction.

4. The combination according to claim 1 wherein
   said further signal produced by said combining means is a D-C error signal; and wherein
   said closed loop feedback circuit further includes
      means for converting said D-C error signal to an A-C signal of related amplitude and predetermined frequency, said A-C signal being said further signal to which said amplifier is responsive;

a synchronous detector for converting the amplified A-C signal from said amplifier to a D-C output signal; and means for filtering noise from the last-named D-C output signal, said last-named D-C output signal being said further signal of increased amplitude, applied by said means for applying to said temperature-varying means.

5. A temperature measuring device, comprising a thermometer containing a fluid sensitive to changes in ambient temperature to expand or contract accordingly, said thermometer having a graduated column on which the level of fluid therein is indicated in terms of degrees of a temperature scale;

a thermoelectric transducer maintained in direct contact with the fluid within said thermometer for sensing the temperature of said fluid and for converting the sensed temperature value to a D-C signal having an amplitude related thereto;

a temperature measuring probe comprising a further thermoelectric transducer for converting temperature values sensed thereby to a further D-C signal of related amplitude;

means for combining the first-named and further D-C signals in opposite polartiy relationship to produce a D-C error signal representative of the difference in temperature values sensed by the first-named and further thermoelectric transducers;

means responsive to a D-C signal for proportionally varying the temperature of said fluid; and a closed loop feedback circuit for amplifying said D-C error signal and for application of the amplified D-C error signal to said temperature-varying means in a sense to equalize the temperature of said transducers, whereby to tend to reduce said D-C error signal to zero value so that the temperature indicated by the level of fluid in said thermometer is indicative of the temperature sensed by said probe.

6. A temperature measuring device, comprising a thermometer containing a fluid sensitive to changes in ambient temperature to expand or contract accordingly, said thermometer having a graduated column on which the level of fluid therein is indicated in terms of degrees of a temperature scale;

a thermoelectric transducer for sensing the temperature of said fluid and for converting the sensed temperature value to a D-C signal having an amplitude related thereto;

a temperature measuring probe comprising a further thermoelectric transducer for converting temperature values sensed thereby to a further D-C signal of related amplitude;

means for combining the first-named and further D-C signals in opposite polarity relationship to produce a D-C error signal representative of the difference in temperature values sensed by the first-named and further thermoelectric transducers;

means responsive to a D-C signal for proportionally varying the temperature of said fluid;

at least a portion of said thermometer containing temperature sensitive fluid, said first-named thermoelectric transducer, and said temperature varying means supported within a thermally conductive non-gaseous medium; and a closed loop feedback circuit for amplifying said D-C error signal and for application of the amplified D-C error signal to said temperature varying means in a sense to equalize the temperature of said transducers, whereby to tend to reduce said D-C error signal to zero value so that the temperature indicated by the level of fluid in said thermometer is indicative of the temperature sensed by said probe.

7. The combination according to claim 6 wherein said thermally conductive medium is a dielectric liquid.

8. The combination according to claim 6 wherein said thermally conductive medium is a mass of aluminum in which said first-named thermoelectric transducer and said temperature varying means are electrically insulated from one another.

References Cited

UNITED STATES PATENTS

| 3,321,974 | 5/1967 | Sterbutzel | 73—359 |
| 3,332,285 | 7/1967 | Cook | 73—359 |

FOREIGN PATENTS

| 1,160,293 | 7/1958 | France. |
| 665,486 | 1/1952 | Great Britain. |

LOUIS R. PRINCE, *Primary Examiner.*

FREDERICK SHOON, *Assistant Examiner.*